A. K. TAYLOR.

BED.

APPLICATION FILED OCT. 29, 1909.

Reissued Apr. 21, 1914.

13,719.

2 SHEETS—SHEET 1.

Witnesses

E. J. Blewitt

F. T. Chapman

Inventor

Arthur K. Taylor.

By C. A. Snow & Co.

Attorneys

COLUMBIA PLANOGRAPH CO., WASHINGTON, D. C.

A. K. TAYLOR.

BED.

APPLICATION FILED OCT. 29, 1909.

Reissued Apr. 21, 1914. 13,719.

2 SHEETS—SHEET 2.

Inventor

Arthur K. Taylor.

By C. A. Snow & Co.

Attorneys

Witnesses

E. F. Clement

F. T. Chapman.

COLUMBIA PLANOGRAPH CO., WASHINGTON, D. C.

UNITED STATES PATENT OFFICE.

ARTHUR KENNON TAYLOR, OF JACKSONVILLE, FLORIDA, ASSIGNOR TO TAYLOR NURSERY BABY BED COMPANY, OF JACKSONVILLE, FLORIDA, A CORPORATION OF FLORIDA.

BED.

13,719. Specification of Reissued Letters Patent. Reissued Apr. 21, 1914.

Original No. 928,821, dated July 20, 1909, Serial No. 464,259. Application for reissue filed October 29, 1909. Serial No. 525,392.

*To all whom it may concern:*

Be it known that I, ARTHUR KENNON TAYLOR, a citizen of the United States, residing at Jacksonville, in the county of Duval and State of Florida, have invented a new and useful Bed, of which the following is a specification.

It is the object of the present invention to provide a crib and supporting means therefor of such construction as to permit of the crib being held above an ordinary bed so as to permit of the care of a child in the crib without necessity of leaving the bed.

Another object of the invention is to provide a foldable crib and support possessing the advantages mentioned above, the object of such a construction being to permit of the device being stored beneath the bed when not in use.

It is also an object of the invention to provide means for adjustably supporting the crib of the device so it may be used in connection with a bed of any ordinary height.

Figure 1:
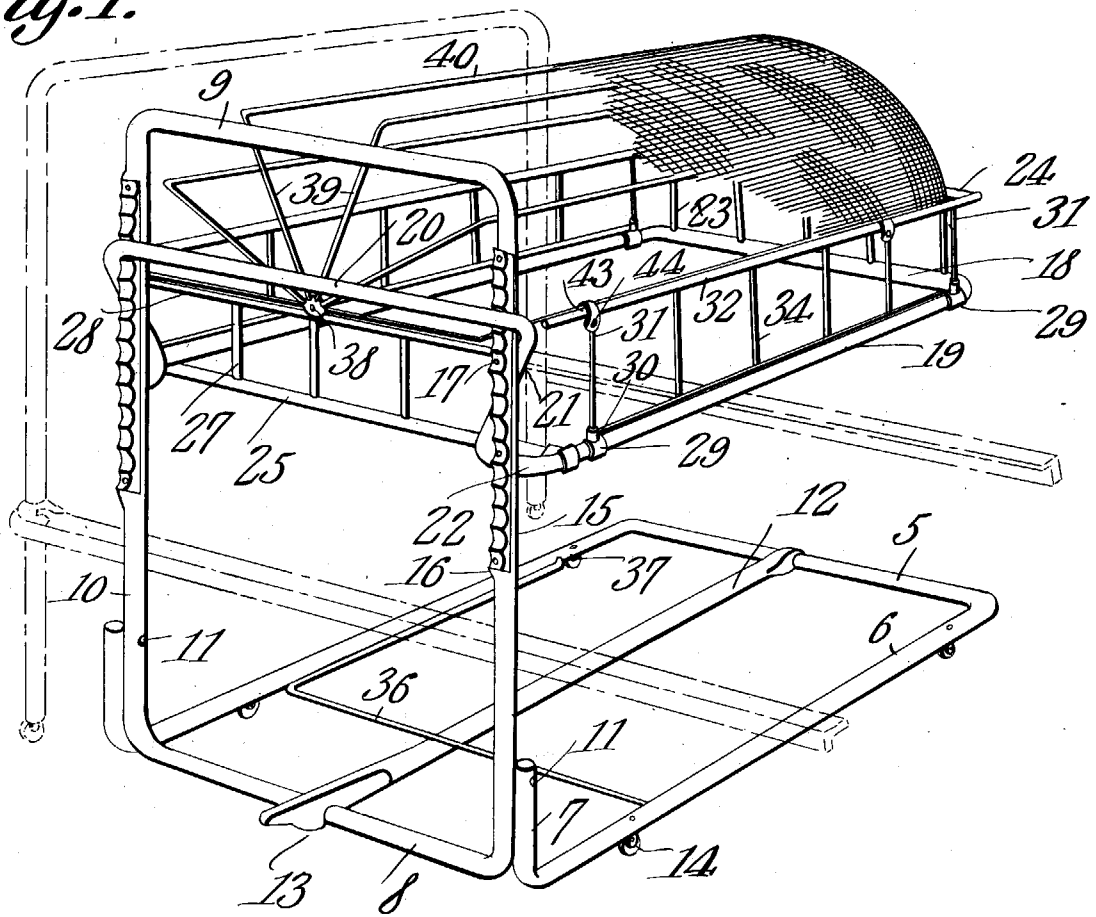
Figure 2:
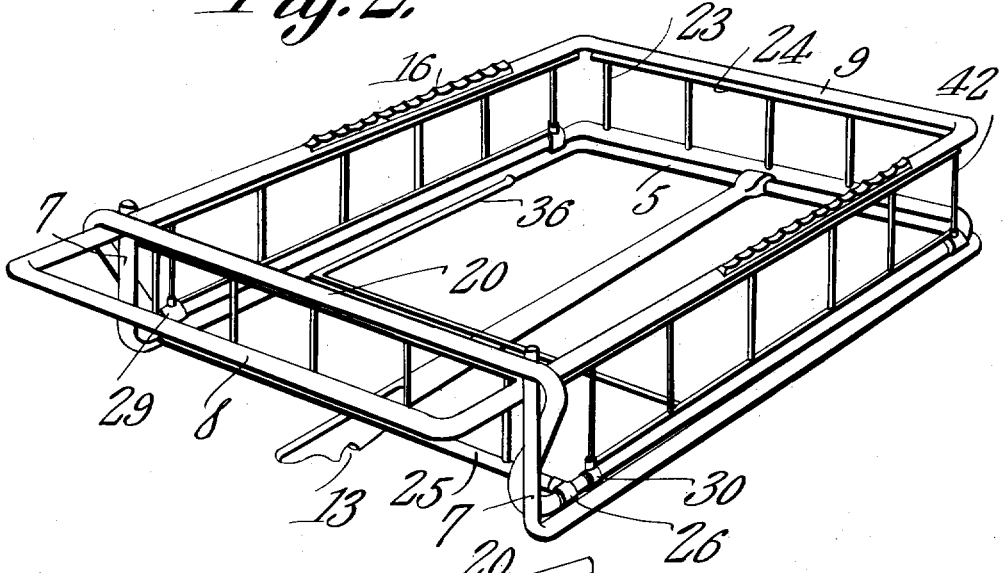
Figure 3:
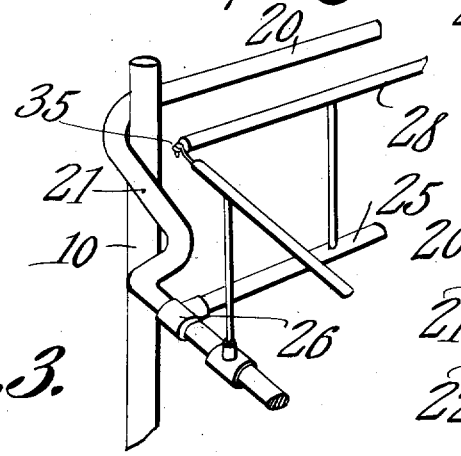
Figure 4:
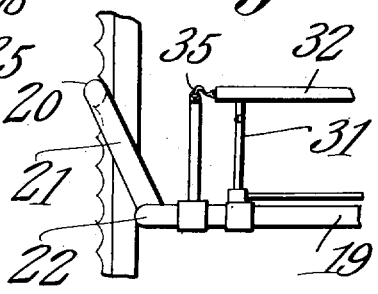

In the accompanying drawings, Figure 1 is a perspective view of the crib and supporting means embodying my invention, the same being shown in connection with an ordinary bed. Fig. 2 is a similar view of the device alone showing the same folded. Fig. 3 is a similar view of one corner of the device showing the means provided for holding the crib at various adjustments, and Fig. 4 is a side elevation also illustrating the adjusting means.

In the drawings, the base frame of the device is shown as comprised of the end rail 5 and the side rails 6, the said side rails, at their free ends being bent to extend upwardly at right angles as at 7.

The supporting frame of the device is comprised of a rail 8, a rail 9, and stiles 10, these rails and stiles forming an open rectangular frame. The supporting frame is hingedly supported upon the base frame by passing through the ends of the upturned portions 7 of the rails of the base frame and the stiles 10 of the supporting frame, pivot bolts 11, these bolts being located adjacent the rail 8 of the supporting frame. This location of the pivot bolts 11 permits the major portion of the supporting frame to extend above the upper ends of the portions 7 of the base frame, as clearly shown in Fig. 1 of the drawings, so that the crib, hereinafter to be described, may be supported at any height desired. In order to hold the supporting frame elevated as illustrated in Fig. 1 of the drawings, a latch bar 12 is pivoted to the rail 5 of the base frame of the device and is formed in its under edge and adjacent its free end with a notch 13 of such size and contour as to receive or engage with the rail 8 of the supporting frame of the device. The base frame of the device is supported upon rollers 14 so that it may be readily moved from place to place.

The means for supporting the crib upon the supporting frame is embodied in rack members which are carried by the stiles 10 of the supporting frame of the device, and in the peculiar construction of one end of the crib itself. Each of the stiles 10 of the supporting frame is recessed as at 15 and seated in the recess in each stile and held therein by means of screws or bolts 16 is a rack bar 17 the notches of which are of such size and contour as to partly embrace one of the end rails of the crib as will be presently described.

The crib, mentioned above, is comprised in part of a main frame including an end rail 18 at the foot end of the frame and side rails 19 which are connected at their foot ends to the ends of the rail 18. The head or rear ends of the side rails 19 are connected by means of an end rail 20 the body portion of which is located in a plane a distance above the plane of the side rails 19 equal to the height of the sides and ends of the crib, and at its ends the said end rail 20 is turned downwardly and inwardly at an acute angle, as at 21, said portions being also off-set in the direction of the foot end of the crib, so that while the body portion of the rail 20 may engage with the rear or rack edges or sides of the stiles 10, the off-set portions 21 will engage with the opposite sides of the said stiles 10 of the supporting frame, the lower ends of said portions 21 being bent to extend outwardly as at 22. It is to the ends of these laterally extended portions of the end rail just described that the rear or head ends of the side rails 19 are connected.

It will be understood from the description of the invention above given that the weight of the main frame of the crib, just described, will hold the off-set portions 21 of the end rail 20 and also the laterally bent portions 22 in engagement with those faces of the stiles 10 which are presented in the direction of the foot end of the crib and that the ends of the main or body portion of the rail 20 will engage or seat in the notches in the rack bars upon the said stiles 10, and that by reason of this engagement, the crib will be firmly supported in the position to which it is adjusted, it being understood that in order to adjust the crib, the foot end thereof is swung upwardly until the body of the rail 20 becomes disengaged from the notches in the rack bars upon the stiles 10 of the suporting frame, and that the crib is to be moved bodily up or down to the desired elevation, after which, the foot end is swung downwardly to its original position when the crib will be firmly supported in its new adjustment in the same manner as it was in its original position.

Vertical filling rods 23 are secured at their lower ends in the rail 18 and support at their upper ends a rail 24 which, in connection with the filling rods 23 and the rail 18, constitutes the foot of the crib. The head of the crib is comprised of a lower rail 25 which is secured at its ends in sockets in couplings 26 which are fixed upon the side rails 19 of the main frame of the crib adjacent their head or rear ends and secured at their lower ends in this rail 25 are filling rods 27 secured at their upper ends, as in the case of the rods 23, in a rail 28, the filling rods 27 and the rail 25, constituting the head of the crib. Rotatably mounted upon each of the side rails 19 of the main frame of the crib adjacent each end thereof is a collar 29 having a socket 30 in which the lower end of a filling rod 31 is secured, the upper end of the rod being secured to a rail 32. A rod 33 is connected at its ends to the sockets 30 of the collars 29 upon each rail 19 and secured at their ends to the rail 32 and the rod 33 just mentioned are other filling rods 34 which complete the sides of the crib, it being understood that these sides may be swung down if so desired, they being held normally in raised position, by means of suitable latches 35 which they carry at the ends of their upper rails 32 and which are engageable with eyes upon the adjacent ends of the rails 24 and 28 of the foot and the head respectively of the crib.

From the foregoing description of my invention, it will be understood that after the supporting frame of the device has been swung to extend vertically, and the crib has been adjusted to the desired elevation, the device may be moved into position with its base frame extending beneath the bed over which the crib is to be positioned as clearly illustrated in Fig. 1 of the drawings. If it is desired to place the crib beside the bed in a position lengthwise thereof, this may be readily done by moving the device across the floor and it will be understood that the crib may be positioned to either side of the bed with equal convenience inasmuch as both sides of the crib may be let down. It will further be understood from the foregoing and from an inspection of Fig. 2 of the drawings, that by lowering the crib until it rests upon the base frame of the device and then disengaging the latch bar 12 from the lower rail 8 of the supporting frame of the device, this latter frame may be swung downwardly upon the upper side of the crib body and that the device when so folded may be stored beneath a bed or other article of furniture until required for use.

When the device is in position beside the bed, it is desirable that some means be provided for supporting the free end of the crib. To this end, I have provided an open rectangular frame 36 which is pivoted at the lower end of its parallel side members as at 37 to the side rails 6 of the base frame of the supporting device for the crib, it being understood that the frame 36 may be swung from the position illustrated in Fig. 1, in which position it is in the same plane as the said base frame, to vertical position in a plane parallel with the supporting frame of the device, the free end of the crib body resting upon the connecting portion of the upper end of the said frame 36.

In order to prevent a child from falling from the crib, I provide, in connection with the crib a canopy which may be folded to lie to one side of the crib or may be stretched over the crib and the construction of this canopy and the manner in which it is mounted upon the crib will now be described.

Secured upon each of the rails 24 and 28 of the foot and head sections respectively of the crib is a disk shaped head 38 provided with a semi-circular series of pivot openings in which are engaged the extremities of arms 39 which are formed by bending at right angles the end portions of rods 40, each rod 40 and the two arms comprising a frame section, it being understood that all the frame sections may be folded to either one side or the other of the crib and in position to lie one upon the other. A sheet of material, preferably mosquito netting or the like, indicated by the numeral 41, is stretched over the frame members just described, including the ends or arms of the said members. Stretched in this manner, it will be seen that an arched canopy is provided and that the frame sections may be folded as heretofore described and as illustrated in Fig. 2 of the drawings, in the manner in which an ordinary buggy top is folded back or collapsed, or may be extended over the crib as illustrated in Fig. 1 of the drawings. Upon each of the filling rods 31, there is provided a button 42 and the frame carries at each side a pair of tabs 43 provided each with a button hole 44 whereby the tabs may be engaged or connected with the buttons 42 to hold the frame in expanded position.

What is claimed is;—

1. In a device of the class described, a foldable supporting member having a rack portion, and a crib having one of its end rails engaged adjustably with the rack.

2. In a device of the class described, a foldable supporting member having crib holding means arranged at different longitudinal points thereon, and a crib having one of its rails engaged adjustably with the crib holding means of the supporting member.

3. In a device of the class described, a base frame, a supporting frame hinged to the base frame, and adapted to be swung to extend vertically thereabove, the axis of the supporting frame being intermediate its upper and lower ends, means hinged to the base frame and engageable with the supporting frame below its axis for holding the same in raised position, and a crib supported by said supporting frame.

4. In a device of the class described, a base frame, a supporting frame hinged to the base frame and adapted to be swung to extend vertically thereabove, a latch bar pivoted to the base frame and engageable with the supporting frame for holding the latter in raised position, and a crib supported by said supporting frame.

5. In a device of the class described, a foldable supporting frame including stiles of rack formation, and a crib having an end formed to receive and grip said rack stiles for supporting the crib upon the frame.

6. In a device of the class described, a base frame, a supporting frame hinged to the base frame and adapted to be swung to extend vertically thereabove, a crib supported at one end from said supporting frame, and a support upon the base frame adapted to be swung vertically to support the other end of said crib.

7. In a device of the class described, a portable self-sustaining, supporting frame, and a crib having one of its sides engaged directly and adjustably with said supporting frame, said frame being foldable on an axis parallel with that side of said crib which is connected directly with said frame.

8. In a device of the class described, a base, a rectangular frame rising from one end of said base, and a crib having a rectangular frame, one end of which is bent upward and provided with portions engaging opposite sides of said support at different levels, whereby to lock said crib on said support by gravity.

9. In a device of the class described, a crib, and a support for the same having an extended base, the support being foldable toward the base into spaced relation thereto with the crib interposed.

10. In a device of the class described, a crib, and a support for the same having a base extending to one side of the said support, the latter being hinged or jointed to fold toward the base into spaced and substantially parallel relation thereto with the crib interposed.

11. In a device of the class described, a crib, and a support for the same having an extended base of substantially the area of the crib and adapted to receive the same, the support being foldable toward the base into spaced relation thereto with the crib interposed.

12. A portable child's crib structure comprising a crib and a support therefor on which the crib is adjustable to different heights, said support sustaining the crib at one end of the latter and being provided with an extended base, the base and support being hinged or pivoted together on an axis above the plane of the base and the support being foldable toward the base about the hinge or pivot connection into substantially parallel spaced relation thereto with the crib interposed.

13. In a device of the class described, a crib, and a support therefor embraced by one end of the crib and along which the latter is adjustable, said support being provided with an extended base underriding the crib and adapted to receive the latter when in its lowermost position, the support being hinged or pivoted to the base and movable into parallel spaced relation with the latter with the crib interposed when said crib is resting on the base.

14. In a device of the class described, a crib and a support therefor embraced by one end of the crib and along which the latter is adjustable, said support being provided with an extended base underriding the crib and adapted to receive the latter when in its lowermost position, the support being hinged or pivoted to the base and movable into parallel spaced relation with the latter with the crib interposed when said crib is resting on the base and without disconnecting the support and corresponding crib-end.

15. A device of the class described comprising a base, a support connected with the base and adapted to be moved into horizontal or upright position with relation to the base, and a crib adjustably connected with the support at one end, the base, support, and crib being of substantially the same size and being adapted to be stored flat upon each other.

16. A device of the class described comprising a base having uprights at one end, a crib of substantially the same size as the base, the depth of the crib being substantially equal to the height of said uprights, and a support connected with said uprights and adapted adjustably to support one end of said crib.

In testimony that I claim the foregoing as my own, I have hereto affixed my signature in the presence of two witnesses.

ARTHUR KENNON TAYLOR.

Witnesses:

DAVID R. DUNHAM,

BEN F. CONE.

Copies of this patent may be obtained for five cents each, by addressing the "Commissioner of Patents, Washington, D. C."